Patented Mar. 18, 1924.

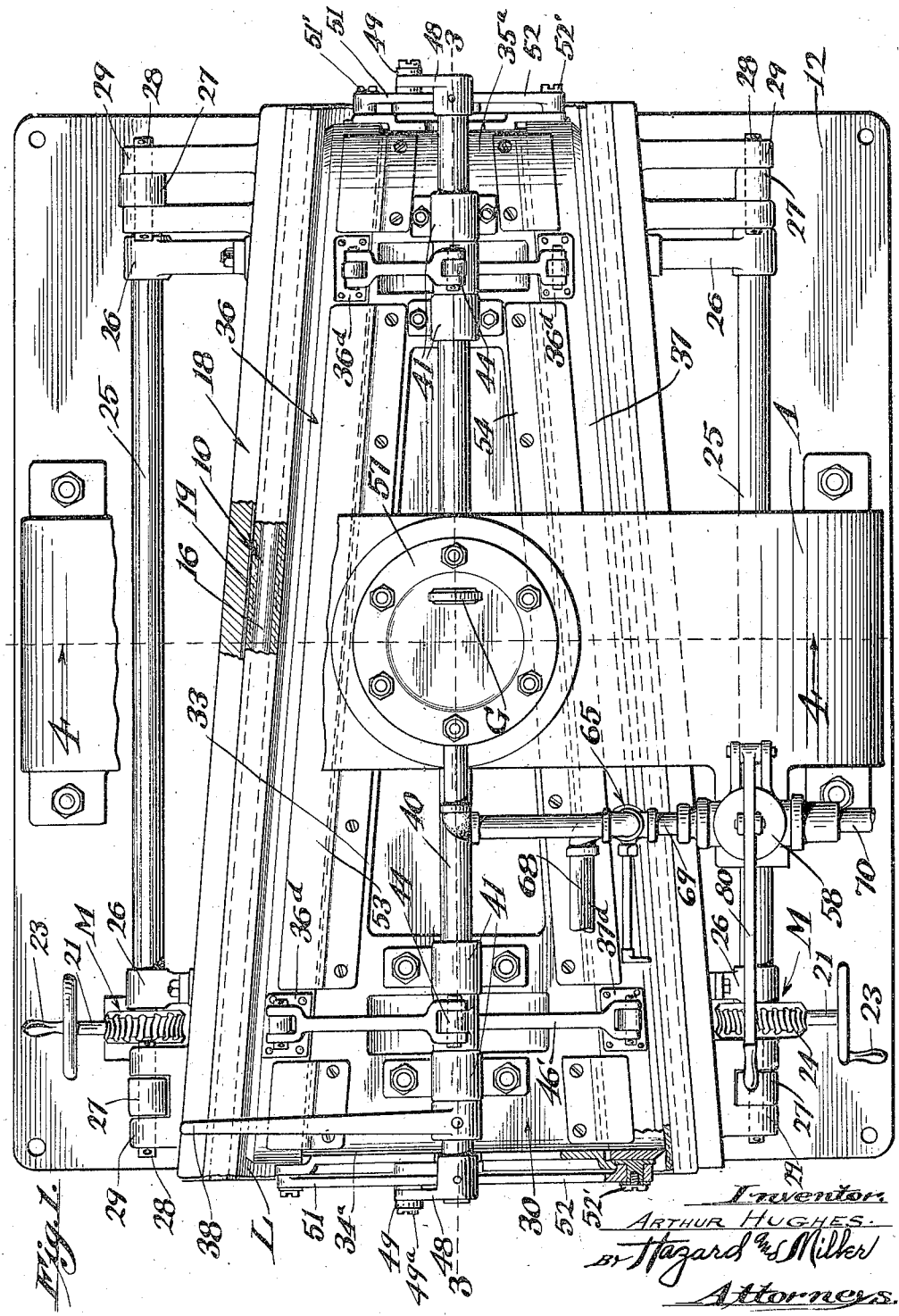

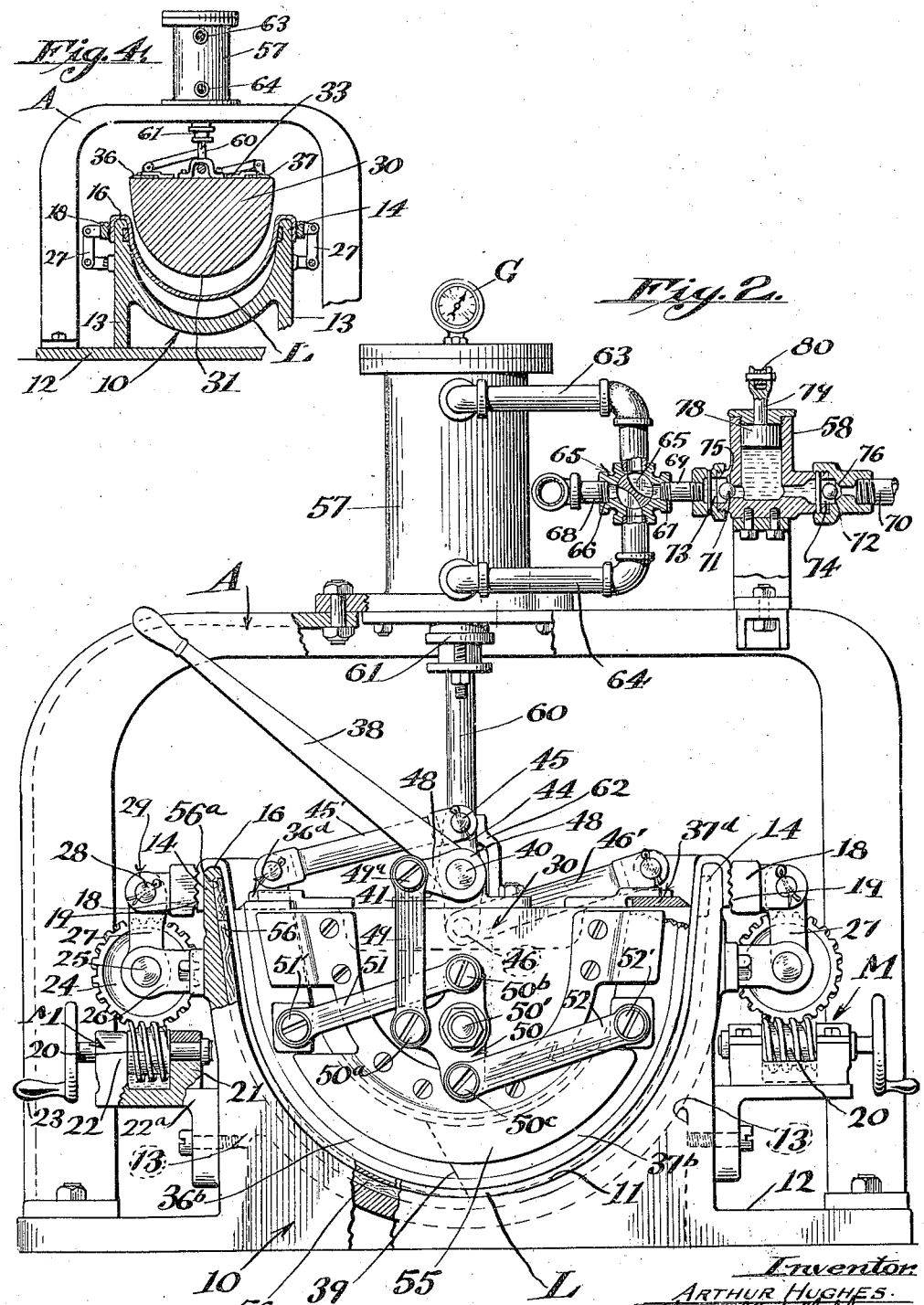

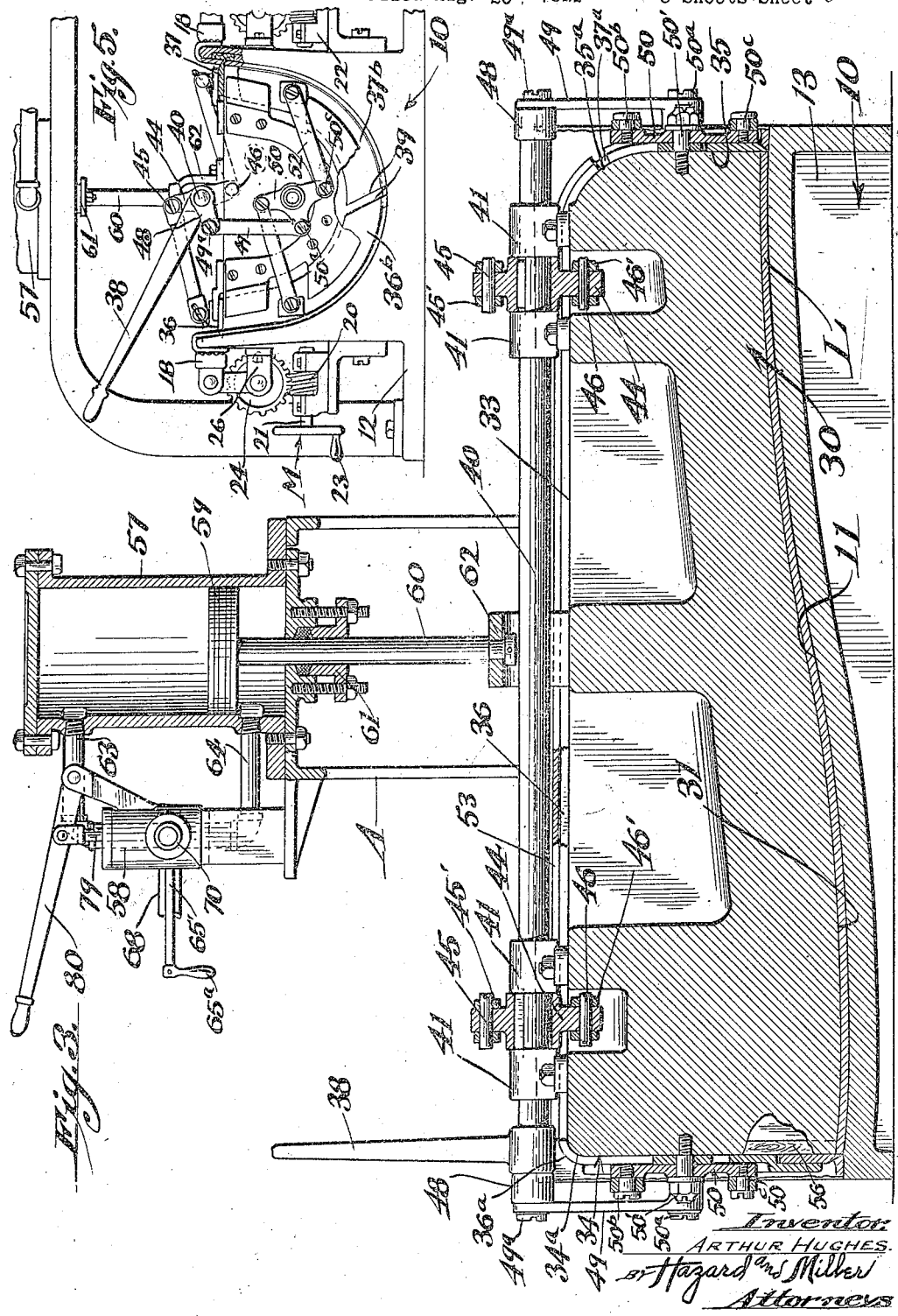

1,487,162

UNITED STATES PATENT OFFICE.

ARTHUR HUGHES, OF LOS ANGELES, CALIFORNIA.

PUTTY MOLDING AND TRIMMING MACHINE.

Application filed August 25, 1922. Serial No. 584,295.

*To all whom it may concern:*

Be it known that I, ARTHUR HUGHES, a citizen of the United States, residing at Los Angeles, in the county of Los Angeles and State of California, have invented new and useful Improvements in Putty Molding and Trimming Machines, of which the following is a specification.

My invention relates to putty molding and trimming machines, and it is an object of my invention to provide a machine of the above mentioned class wherein the molding is effected by a head operated by fluid pressure which is adapted to move in and out of a mould or matrix.

Another object is to provide a putty trimming mechanism whereby the trimming is effected by one movement of a single lever.

I accomplish these objects by a mechanism, a practical embodiment of which is herein disclosed by the following description of the accompanying drawings and the novel features thereof pointed out in the appended claims.

Referring to the drawings,

Figure 1 is a top plan view with parts broken away and shown in section.

Fig. 2 is a front elevation showing the leather as it appears after pressure has been applied, with parts broken away and shown in section.

Fig. 3 is longitudinal section on the line 3—3 of Fig. 1, wherein certain parts of the fluid pressure mechanism are shown in side elevation.

Fig. 4 is a transverse section on the line 4—4 of Fig. 1 on a reduced scale showing the stamp in elevated position and the leather as it appears prior to being pressed.

Fig. 5 is a front elevation similar to Fig. 2 showing the cutting mechanism as it appears after the leather has been cut.

Referring by numerals to the accompanying drawings, 10 designates an outer mould or matrix, preferably formed of cast metal, the inner surface 11 being cored and finished to a shape which is curved in transverse section throughout its length, while in longitudinal section a curve similar to that of the calf of a leg is formed, as shown in Fig. 3. A base portion 12 is provided from which extend vertical side walls 13 which unite with the curved portion 11 and extend upwardly and outwardly a short distance above the same, as designated at 14.

The upper surfaces 16 of the walls 14 are curved in cross section and lie in horizontal planes throughout their length.

It is necessary that the leather L be firmly clamped in a position clear of the surface 11 of the matrix as shown in Fig. 4, and to hold the leather in this position, adjustable clamping devices are provided on each side of the matrix. These devices consist of clamping bars 18 which extend the full length of the sides 13 and are corrugated or toothed on their inner sides as designated at 19. In order to move the bars 18 into and out of engagement with the leather, worm and gear movements M are provided consisting of worms 20 keyed to shafts 21 mounted in bearings 22 fastened to brackets 22ª which are secured to the side walls 13 by bolts or screws.

The shafts 21 are provided at their outer ends with hand wheels or cranks 23 for rotating same. The worms 20 mesh with gears 24 keyed to shafts 25 mounted in bearings 26 fastened to the side walls 13 at the forward and rear end of the matrix. Fixed to the shafts 25 are lever arms 27 which are also connected to the bars 18 by means of pins 28 extending through lugs 29 on the bars 18.

In order to press the leather into the matrix, a head or press 30 is utilized, the under surface 31 being of substantially the same shape as the inner surface of the matrix.

The top surface 33 of the head is flat horizontally and curved at its forward and rear ends 34ª and 35ª, while the front and rear ends 34 and 35 are flat and at right angles to the surface 33; these surfaces forming a pattern for the trimming of the leather.

The trimming is accomplished by a mechanism adapted to operate cutting blades 36 and 37 which trim the leather into shape by one movement of a lever 38. The blades 36 and 37 extend across the upper surface 33 of the head 30 and are then curved downwardly at their forward and rear ends 36ª and 37ª, then curved inwardly as designated at 36ᵇ and 37ᵇ, and overlap each other at the terminus of the curved portions as designated at 39, as clearly shown in Fig. 2.

The blades 36 and 37 are adapted to move simultaneously in opposite directions, and this movement is effected by a mechanism consisting of a shaft 40 mounted in sets of bearings 41 fastened to the top of the head 30 near its forward and rear ends, and fixed to the shaft 40 is the lever 38 and also fixed to the shaft 40 between the sets of bearings 41 are rocker arms 44, having oppositely disposed pivot pins 45 and 46 to which are connected links 45' and 46' also pivoted to brackets 36ᵈ and 37ᵈ fastened to the cutting blades 36 and 37.

Fixed to the forward and rear ends of the shaft are rocker arms 48 to which are connected links 49, which are in turn connected to quadrants 50 pivoted to the front and rear ends of the head 30 as designated at 50', by pins 49ª and 50ª. The quadrants 50 are provided with oppositely disposed pivot pins 50ᵇ and 50ᶜ to which are connected links 51 and 52 also connected by pins 51' and 52' which are fastened to the curved portions of the blades 35 and 36.

In order to hold the cutting blades in contact with the surfaces of the head, guide plates 53 and 54 are fastened to the surface 33 and partially extend over the top sides of the blades 36 and 37, while other guide plates 55 hold the curved portions 36ᵇ and 37ᵇ against the front and rear surfaces 34 and 35.

When the blades cut through the leather it is necessary to provide cushions in order to prevent dulling or breaking, and for this purpose I provide wood or fibre inserts 56 in grooves 56ª on the inner sides of the matrix opposite the cutting edges of the blades 36 and 37.

In order to raise and lower the head 30 and press the leather into shape, a suitable pressure mechanism is employed which is preferably operated by hydraulic pressure taken from municipal water mains or from a static pressure tank. This mechanism consists of a large cylinder 57 and a small cylinder 58 mounted on an arched member A extending over the top of the machine and fastened to the base 12. The large cylinder 57 is provided with a piston 59 from which extends a rod 60 through a stuffing box 61 and is connected to the head by a yoke 62 which straddles the shaft 40. The cylinder 57 is provided with a pressure gauge G and has inlet and outlet ports at its upper lower ends to which are connected pipes 63 and 64 also connected to a four-way valve 65. The valve 65 is provided with threaded openings 66 and 67 to which are connected pipes 68 and 69. The pipe 68 is used for discharging, while the pipe 69 is connected to the cylinder 58.

The small cylinder 58 is utilized to increase pressure in the large cylinder above that of the static pressure referred to when it is necessary to press the leather, the static pressure being sufficient to raise and lower the head into and out of the matrix. The cylinder 58 is provided with a piston 78 moved by a rod 79 connected to a lever 80 and is provided with check valves 71 and 72 in chambers 73 and 74 having seats 75 and 76. It will be seen that this mechanism provides a hydraulic pump.

Water is introduced into the system through a pipe 70 connected to the cylinder 58 and will normally flow through the cylinder 58 and valve 65 to the upper or lower end of the cylinder according to the position of said valve. The valve 65 is operated by a valve stem 65' provided with a handle 65ª.

Having thus described the construction of my invention, I will now describe the operation of same, which is as follows:

Assuming that the head 30 has been raised clear of the mould or matrix as shown in Fig. 4, a piece of leather is then inserted between the head and matrix, the sides are then turned down over the top surfaces of the side walls 13 and clamped by means of the clamping bars 18. The valve 65 is then moved into a position shown in Fig. 2 which allows water to flow through the small cylinder 58, pipe 69 and valve 65, thence through pipe 63 to the top of the cylinder 57 exerting a pressure on the piston 59 which forces the head downwardly onto the leather and partially presses the same into shape. After the piston ceases to move by static pressure, the lever 80 is then operated until a predetermined pressure is indicated by the gauge C. The lever 38 is then moved downward to a position shown in Fig. 5 trimming the leather. It is obvious that by reversing the above operation the finished product may be removed.

Various modifications and changes may be made herein without departing from the spirit of the invention as claimed.

What is claimed is:

1. A putty molding and trimming machine comprising a matrix having an inner surface curved in cross section throughout its length and curved in longitudinal section similar to that of the calf of a leg, clamping means for holding a strip of leather clear of the sides and bottom, a head adapted to be moved into and from said matrix and having a surface on its under side substantially of the same shape as the inner surface of the matrix, and means for operating said head, and a trimming mechanism mounted on said head.

2. A putty molding and trimming machine comprising a matrix having an inner surface curved in cross section throughout its length and curved in longitudinal section similar to that of the calf of a leg, said matrix being open at each end, one end being larger than the other, clamping means for holding a strip of leather clear of the sides and bottom, a head adapted to be moved into and from said matrix and having a surface on its under side substantially of the same shape as the inner surface of the matrix, means for operating said head, and a trimming mechanism mounted on said head.

3. A putty molding and trimming machine comprising a matrix having an inner surface curved in cross section throughout its length and curved in longitudinal section similar to that of the calf of a leg, clamping means for holding a strip of leather clear of the sides and bottom, a head adapted to be moved into and from said matrix and having a surface on its under side substantially of the same shape as the inner surface of the matrix, means for operating said head, a trimming mechanism including cutters mounted on said head, and a lever for actuating said cutters.

4. In a putty molding and trimming machine, the combination of a bottom mould, a trimming mechanism and a presser head, said trimming mechanism consisting of a shaft mounted on said head, duplex blades at the ends of the mould, a series of rocker arms and links operated by the shaft adapted to move the duplex trimming blades in opposite directions to effect a complete trimming of a strip of leather in one action.

5. In a putty molding and trimming machine, the combination of a trimming mechanism and a presser head, said trimming mechanism consisting of a shaft mounted on said head, a series of rocker arms and links adapted to move duplex trimming blades in opposite directions to effect a complete trimming of a strip of leather in one action, the said mechanism being manually operable after the head has passed into the mould.

6. In a putty molding and trimming machine, the combination of a trimming mechanism and a presser head, said trimming mechanism consisting of a shaft mounted on said head, a series of rocker arms and links adapted to move duplex trimming blades in opposite directions to effect a complete trimming of a strip of leather in one action, the said mechanism being manually operable after the head has passed into the mould, said mechanism including a single manually operable lever.

In testimony whereof I have signed my name to this specification.

ARTHUR HUGHES.